(12) United States Patent
Watanabe

(10) Patent No.: US 8,930,508 B2
(45) Date of Patent: Jan. 6, 2015

(54) DEVICE MANAGEMENT APPARATUS, DEVICE MANAGEMENT METHOD, AND COMPUTER-READABLE STORAGE MEDIUM

(75) Inventor: Kazuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 13/526,576

(22) Filed: Jun. 19, 2012

(65) Prior Publication Data

US 2013/0041992 A1 Feb. 14, 2013

(30) Foreign Application Priority Data

Aug. 9, 2011 (JP) ................................. 2011-174411

(51) Int. Cl.
G06F 15/173 (2006.01)
G06F 15/177 (2006.01)
H04L 12/24 (2006.01)

(52) U.S. Cl.
CPC ............. *H04L 41/147* (2013.01); *H04L 41/085* (2013.01)
USPC ......................................... 709/220; 709/226

(58) Field of Classification Search
CPC G06F 3/048; G01C 21/3492; G01C 21/3691; H04L 43/16; H04L 12/2602; H04L 41/5009; H04L 41/085
USPC ........................................... 709/223, 220, 226
See application file for complete search history.

(56) References Cited

U.S. PATENT DOCUMENTS

| | | | |
|---|---|---|---|
| RE37,811 E * | 7/2002 | Sitbon et al. ....................... 700/1 |
| 2005/0026578 A1* | 2/2005 | Kelley ........................... 455/132 |
| 2007/0106796 A1* | 5/2007 | Kudo et al. .................... 709/226 |
| 2010/0058342 A1* | 3/2010 | Machida ............................ 718/1 |
| 2013/0232260 A1* | 9/2013 | Narayana et al. ............. 709/224 |

FOREIGN PATENT DOCUMENTS

| | | |
|---|---|---|
| JP | 07-219907 | 8/1995 |
| JP | 2010-068367 | 3/2010 |
| JP | 2010-124382 | 6/2010 |
| WO | WO-2008/084826 A1 | 7/2008 |

* cited by examiner

*Primary Examiner* — Tauqir Hussain
*Assistant Examiner* — Ebrahim Golabbakhsh
(74) *Attorney, Agent, or Firm* — Fujitsu Patent Center

(57) ABSTRACT

A management server calculates a correlation coefficient between the number of settings executed in a network device and load information of communication of the network device with respect to each of network devices which are objects of management. The management server identifies a network device of which the load is on a rising trend on the basis of a calculated correlation coefficient and load information of processing of the network device. The management server selects an object of change of the settings from among network devices other than the identified network device.

9 Claims, 12 Drawing Sheets

FIG.4

| RECORDED TIME | CPU INFORMATION (CURRENT) [%] | CPU INFORMATION (AVERAGE) [%] | MEMORY INFORMATION (CURRENT) [MB] | MEMORY INFORMATION (AVERAGE) [MB] | TRAFFIC INFORMATION [Mbps] | CONNECTION INFORMATION [NUMBER OF CONNECTIONS] |
|---|---|---|---|---|---|---|
| 2011/3/10 13:30 | 20 | 20 | 100MB | 80MB | 200 | 100 |
| 2011/3/10 13:31 | 21 | 20 | 102MB | 80MB | 210 | 105 |
| ... | | | | | | |
| 2011/3/10 13:50 | 25 | 21 | 110MB | 82MB | 210 | 105 |
| 2011/3/11 9:50 | 20 | 20 | 100MB | 80MB | 200 | 100 |

| RECORDED TIME | CPU INFORMATION (CURRENT) [%] | CPU INFORMATION (AVERAGE) [%] | MEMORY INFORMATION (CURRENT) [MB] | MEMORY INFORMATION (AVERAGE) [MB] | TRAFFIC INFORMATION [Mbps] | CONNECTION INFORMATION [NUMBER OF CONNECTIONS] |
|---|---|---|---|---|---|---|
| 2011/3/10 13:30 | 30 | 30 | 150MB | 120MB | 300 | 100 |
| 2011/3/10 13:31 | 32 | 30 | 155MB | 120MB | 300 | 100 |
| ... | | | | | | |
| 2011/3/10 13:50 | 30 | 30 | 100MB | 80MB | 200 | 100 |
| 2011/3/11 9:50 | 50 | 50 | 250MB | 255MB | 400 | 210 |

| RECORDED TIME | CPU INFORMATION (CURRENT) [%] | CPU INFORMATION (AVERAGE) [%] | MEMORY INFORMATION (CURRENT) [MB] | MEMORY INFORMATION (AVERAGE) [MB] | TRAFFIC INFORMATION [Mbps] | CONNECTION INFORMATION [NUMBER OF CONNECTIONS] |
|---|---|---|---|---|---|---|
| 2011/3/10 13:30 | 60 | 60 | 300MB | 300MB | 200 | 100 |
| 2011/3/10 13:31 | 60 | 60 | 302MB | 300MB | 200 | 100 |
| ... | | | | | | |
| 2011/3/10 13:50 | 60 | 60 | 310MB | 300MB | 200 | 100 |
| 2011/3/11 9:50 | 60 | 60 | 295MB | 300MB | 200 | 100 |

| RECORDED TIME | CPU INFORMATION (CURRENT) [%] | CPU INFORMATION (AVERAGE) [%] | MEMORY INFORMATION (CURRENT) [MB] | MEMORY INFORMATION (AVERAGE) [MB] | TRAFFIC INFORMATION [Mbps] | CONNECTION INFORMATION [NUMBER OF CONNECTIONS] |
|---|---|---|---|---|---|---|
| 2011/3/10 13:30 | 20 | 20 | 100MB | 80MB | 200 | 100 |
| 2011/3/10 13:31 | 20 | 20 | 101MB | 80MB | 205 | 100 |
| ... | | | | | | |
| 2011/3/10 13:50 | 21 | 20 | 105MB | 80MB | 209 | 105 |
| 2011/3/11 9:50 | 19 | 20 | 100MB | 80MB | 198 | 98 |

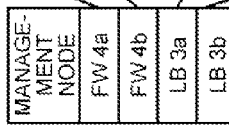

MANAGEMENT NODE
FW 4a
FW 4b
LB 3a
LB 3b

FIG.5

| RECORDED TIME | TYPE OF Config | DEFINITION AMOUNT | TRAFFIC INFORMATION (AVERAGE) | CORRELATION COEFFICIENT (DEFINITION-TRAFFIC) | CPU INFORMATION (AVERAGE) | CORRELATION COEFFICIENT (CPU-TRAFFIC) |
|---|---|---|---|---|---|---|
| 2011/3/10 13:30 | fw | 130 | 5000 | 0.7 | 20 | 0.7 |
| 2011/3/10 13:31 | fw | 160 | 5300 | 0.7 | 25 | 0.7 |
| 2011/3/10 13:32 | fw | 190 | 5600 | 0.7 | 30 | 0.7 |
| ⋮ | | | | | | |
| 2011/3/10 13:50 | fw | 270 | 7000 | 0.7 | 40 | 0.7 |
| 2011/3/11 9:50 | fw | 100 | 4000 | 0.5 | 15 | 0.5 |

| RECORDED TIME | TYPE OF Config | DEFINITION AMOUNT | TRAFFIC INFORMATION (AVERAGE) | CORRELATION COEFFICIENT (DEFINITION-TRAFFIC) | CPU INFORMATION (AVERAGE) | CORRELATION COEFFICIENT (CPU-TRAFFIC) |
|---|---|---|---|---|---|---|
| 2011/3/10 13:30 | fw | 130 | 5000 | 0.1 | 20 | 0.1 |
| 2011/3/10 13:31 | fw | 160 | 5010 | 0.1 | 20 | 0.1 |
| 2011/3/10 13:32 | fw | 190 | 5100 | 0.2 | 20 | 0.1 |
| ⋮ | | | | | | |
| 2011/3/10 13:50 | fw | 270 | 5000 | -0.1 | 20 | 0.1 |
| 2011/3/11 9:50 | fw | 100 | 5030 | 0.1 | 20 | 0.1 |

| RECORDED TIME | TYPE OF Config | DEFINITION AMOUNT | NUMBER OF CONNECTIONS (AVERAGE) | CORRELATION COEFFICIENT (DEFINITION-CONNECTIONS) | CPU INFORMATION (AVERAGE) | CORRELATION COEFFICIENT (CPU-CONNECTIONS) |
|---|---|---|---|---|---|---|
| 2011/3/10 13:30 | lb | 130 | 500 | 0.7 | 20 | 0.1 |
| 2011/3/10 13:31 | lb | 160 | 600 | 0.7 | 20 | 0.1 |
| 2011/3/10 13:32 | lb | 190 | 700 | 0.7 | 20 | 0.1 |
| ⋮ | | | | | | |
| 2011/3/10 13:50 | lb | 270 | 1000 | 0.7 | 20 | 0.1 |
| 2011/3/11 9:50 | lb | 100 | 400 | 0.7 | 20 | 0.1 |

| RECORDED TIME | TYPE OF Config | DEFINITION AMOUNT | NUMBER OF CONNECTIONS (AVERAGE) | CORRELATION COEFFICIENT (DEFINITION-CONNECTIONS) | CPU INFORMATION (AVERAGE) | CORRELATION COEFFICIENT (CPU-CONNECTIONS) |
|---|---|---|---|---|---|---|
| 2011/3/10 13:30 | lb | 130 | 500 | 0.7 | 20 | 0.1 |
| 2011/3/10 13:31 | lb | 160 | 600 | 0.7 | 20 | 0.1 |
| 2011/3/10 13:32 | lb | 190 | 700 | 0.7 | 20 | 0.1 |
| ⋮ | | | | | | |
| 2011/3/10 13:50 | lb | 270 | 1000 | 0.7 | 20 | 0.1 |
| 2011/3/11 9:50 | lb | 100 | 400 | 0.7 | 20 | 0.1 |

MANAGEMENT NODE
- FW 4a
- FW 4b
- LB 3a
- LB 3b

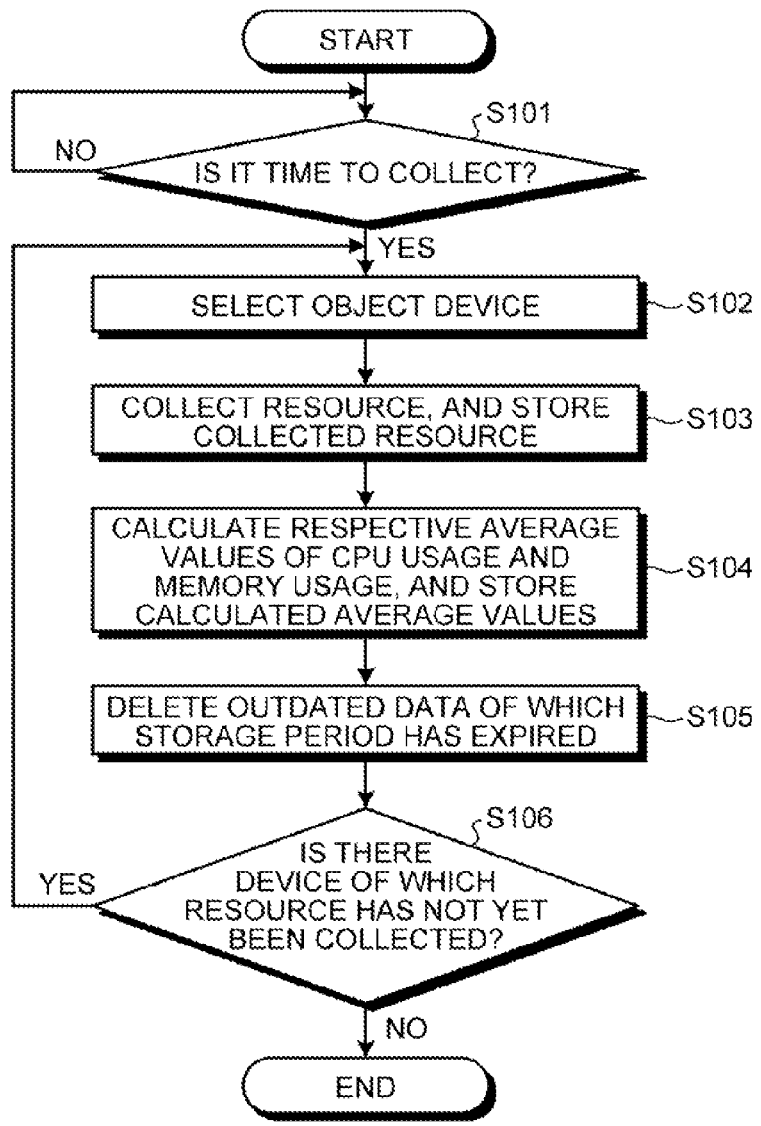

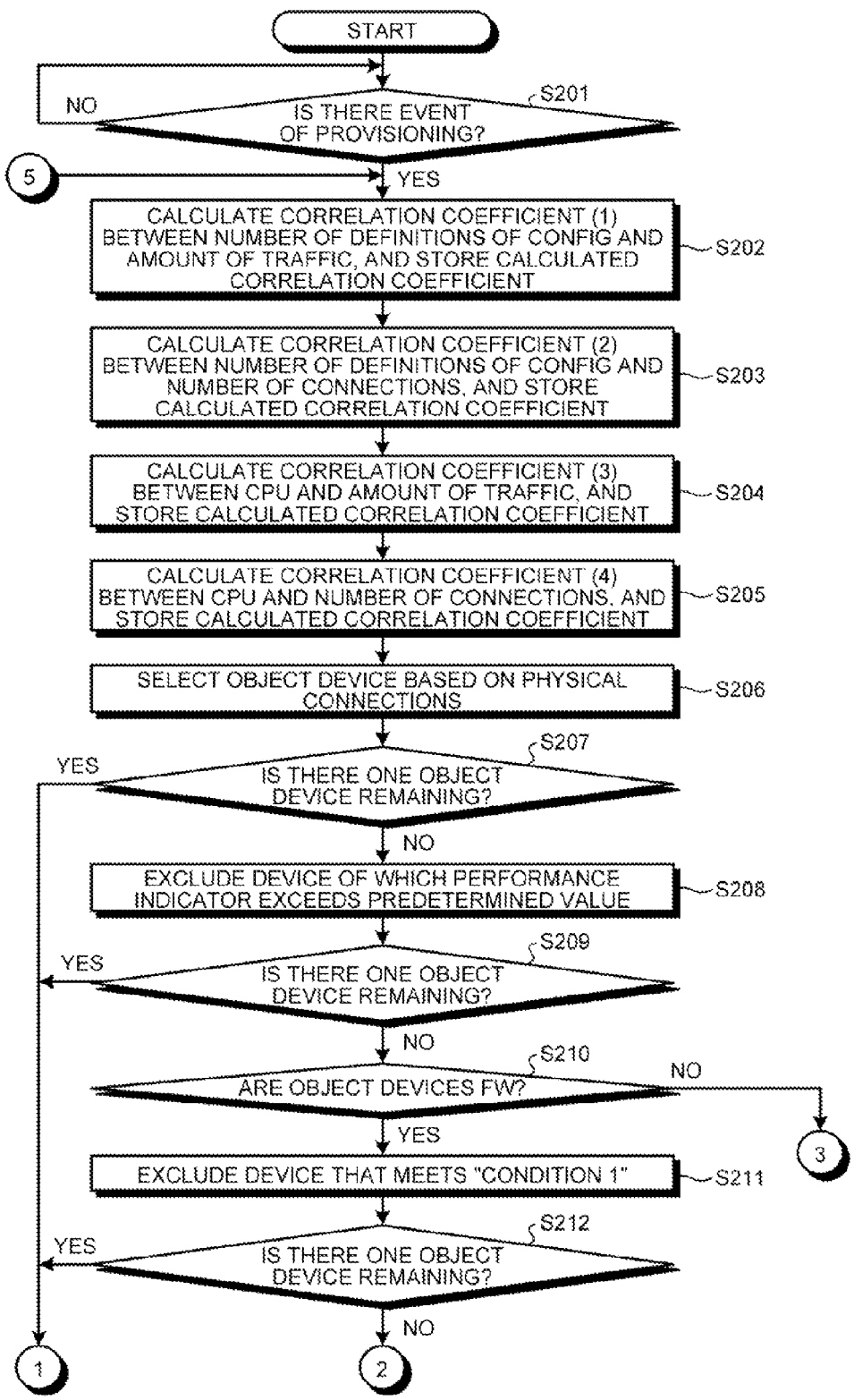

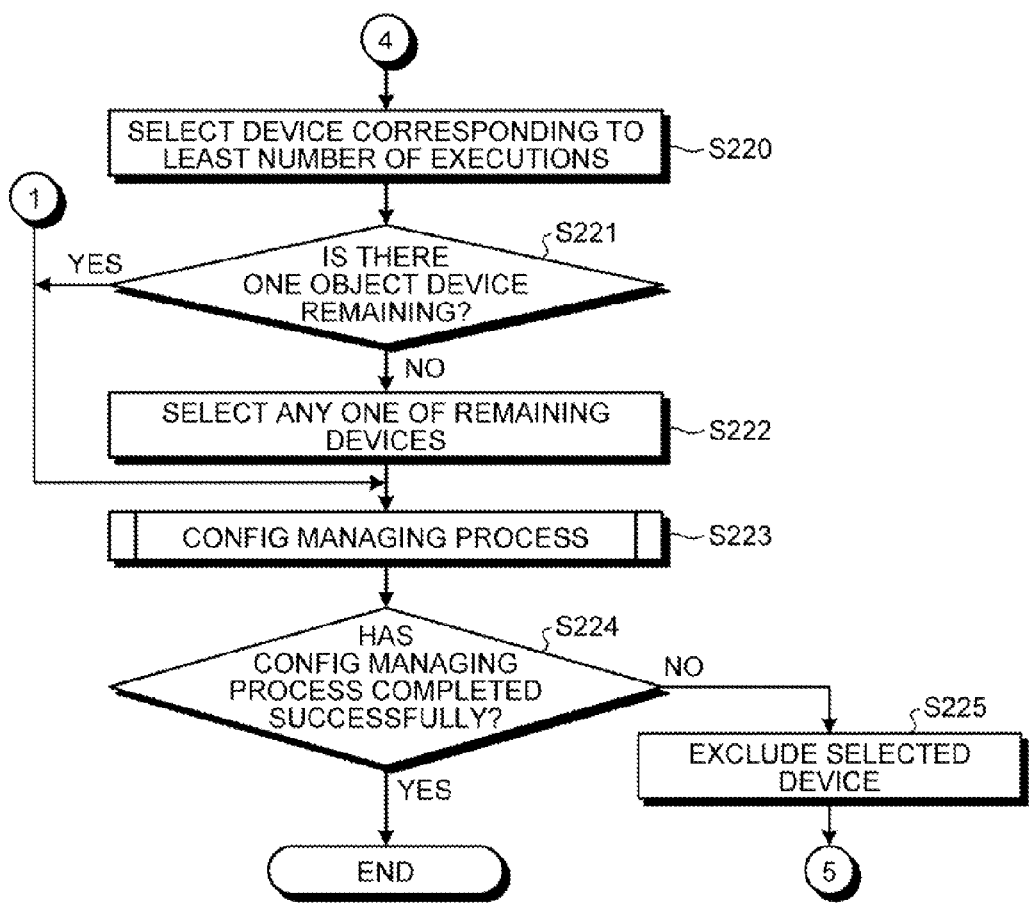

DEVICE MANAGEMENT APPARATUS, DEVICE MANAGEMENT METHOD, AND COMPUTER-READABLE STORAGE MEDIUM

CROSS-REFERENCE TO RELATED APPLICATION

This application is based upon and claims the benefit of priority of the prior Japanese Patent Application No. 2011-174411, filed on Aug. 9, 2011, the entire contents of which are incorporated herein by reference.

FIELD

The embodiments discussed herein are directed to a device management apparatus, a device management method, and a device management program.

BACKGROUND

In recent years, a system that manages server devices and network devices in an integrated fashion and provides a service or an application to a user via a network has been used.

In such a system, when a new virtual machine (VM) is activated on a server device, an object device on which the VM is to be activated is identified, and the VM is installed and activated on the identified device. Processing in the installation of the VM is generally called provisioning. As examples of the provisioning process, there are change of the settings in a firewall, change of the route of a switch, and the like.

As a technology to identify an object device of provisioning, there is known a technology to identify a network device on the shortest route in routes from a new VM to the Internet. Furthermore, there is also known a technology to monitor traffic of a network topology and identify a network device on the lowest-traffic route. Moreover, there is also known a technology to identify a highest-performance network device.

Patent document 1: Japanese Laid-open Patent Publication No. 07-219907
Patent document 2: Japanese Laid-open Patent Publication No. 2010-068367
Patent document 3: Japanese Laid-open Patent Publication No. 2010-124382
Patent document 4: International Publication Pamphlet No. WO 2008/084826

However, in the methods for identifying an object device of provisioning according to the conventional technologies, there is a problem that the load on a identified network device is increased, and the load balance of the entire system is worsened, resulting in degradation of an efficiency of the system operation.

There is explained an example where new VMs are sequentially activated on a system having three firewall devices that differ in processing performance. When provisioning is executed each time a VM is activated, an object device of provisioning is identified each time a VM is activated. If the conventional technology is used in such a case, one firewall device is continuously identified as an object of provisioning.

Specifically, provisioning is continuously executed on a highest-performance firewall device in the three firewall devices. Or, provisioning is continuously executed on a firewall device identified as the one on the shortest route. Therefore, the processing load on one firewall device is increased, and the load balance of the entire system is worsened. In such a state, there may be a delay in processing via the firewall device on which the processing load is increased, and an efficiency of the system operation may be degraded.

SUMMARY

According to an aspect of an embodiment of the invention, a device management apparatus includes a calculating unit that calculates a correlation coefficient between the number of settings executed in a network device and load information of communication of the network device with respect to each of network devices which are objects of management; an identifying unit that identifies a network device of which the load is on a rising trend on the basis of a correlation coefficient calculated by the calculating unit and load information of processing of the network device; and a selecting unit that selects an object of change of the settings from among network devices other than the network device identified by the identifying unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an example of information stored in a resource information DB;
FIG. 5 is a diagram illustrating an example of information stored in a correlation coefficient DB;
FIG. 6 is a diagram illustrating an example of information stored in an execution count DB;
FIG. 7 is a flowchart illustrating a flow of a resource collecting process;
FIG. 8A is a flowchart illustrating a flow of a process of selecting a provisioning executed object;
FIG. 8C is a flowchart illustrating the flow of the process of selecting a provisioning executed object.

DESCRIPTION OF EMBODIMENTS

Preferred embodiments of the present invention will be explained with reference to accompanying drawings. Incidentally, the present invention is not limited to the embodiments.

[a] First Embodiment

Overall Configuration

Figure 1:
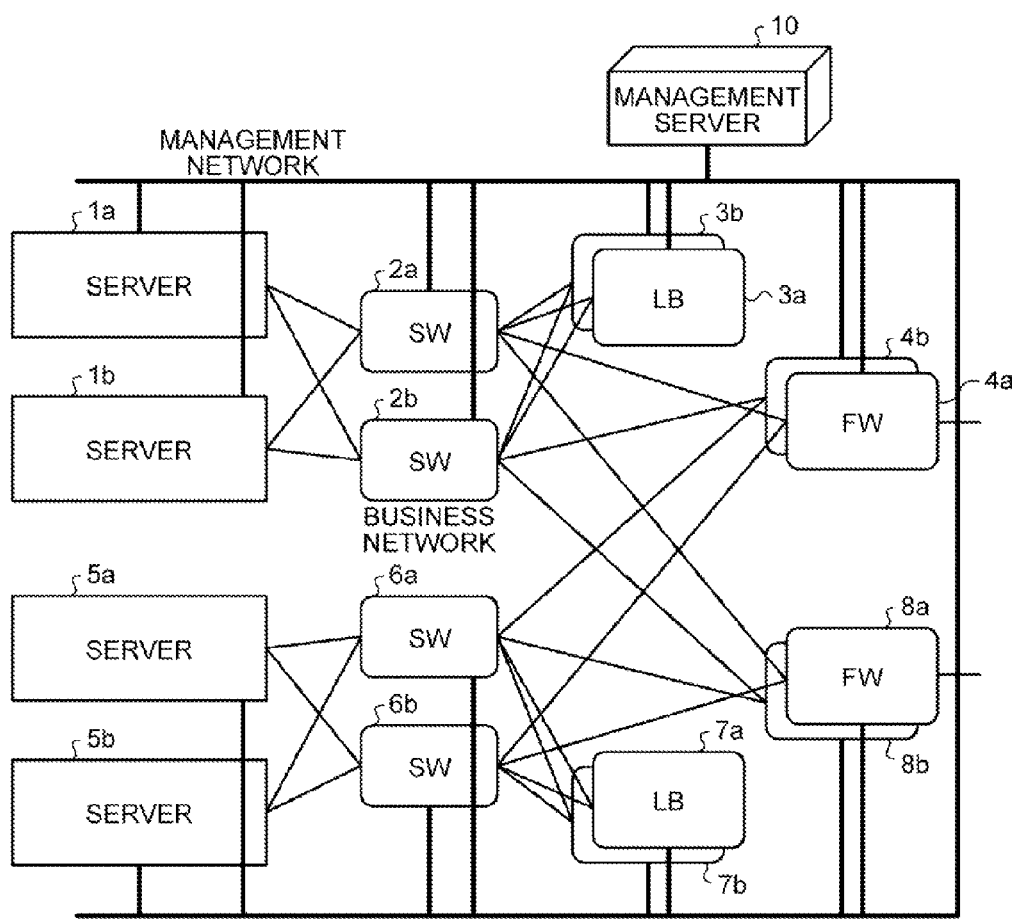
FIG. 1 is a diagram illustrating an example of an overall configuration of a system according to a first embodiment.

FIG. 1 is a diagram illustrating an example of an overall configuration of a system according to a first embodiment. As illustrated in FIG. 1, this system has a management server 10, a plurality of servers, a plurality of switches (SWs), a plurality of load balancers (LBs), and a plurality of firewall devices (FWs). The management server 10 and the devices are connected via a management network that is not used in provision of services to users. The devices are connected via a business network. Users (not illustrated) and the system illustrated in FIG. 1 are connected via the FWs, respectively.

This system is constructed by a scale-out model composed of two servers, two switches, two load balancers, and two firewall devices as a basic network configuration pattern. Namely, the system is constructed by one scale-out model composed of a server 1a, a server 1b, a SW 2a, a SW 2b, a LB 3a, a LB 3b, a FW 4a, and a FW 4b and another one scale-out model composed of a server 5a, a server 5b, a SW 6a, a SW 6b, a LB 7a, a LB 7b, a FW 8a, and a FW 8b.

The server illustrated in FIG. 1 is a Web server or a DB server, etc. which provides services to users. A virtual machine (VM) or the like for providing various services is activated on the server. The switch is a network device for connecting the server to another device, such as a switching hub. The LB is a load distribution device for distributing requests received from outside to the servers according to respective loads on the servers, and the FW is a network device for controlling communication between an internal network and an external network to block unauthorized access or the like.

This system can be applied to a cloud system or the like in which a plurality of scale-out models are connected to provide services to users. Incidentally, the basic network configuration pattern illustrated in FIG. 1 is just an example, and the types and number of devices composing the basic network configuration pattern are not limited to those illustrated in FIG. 1. Furthermore, in what follows, for convenience of explanation, the scale-out model composed of the server 1a, the server 1b, the SW 2a, the SW 2b, the LB 3a, the LB 3b, the FW 4a, and the FW 4b is described as an object of management.

Configuration of Management Server

Figure 2:
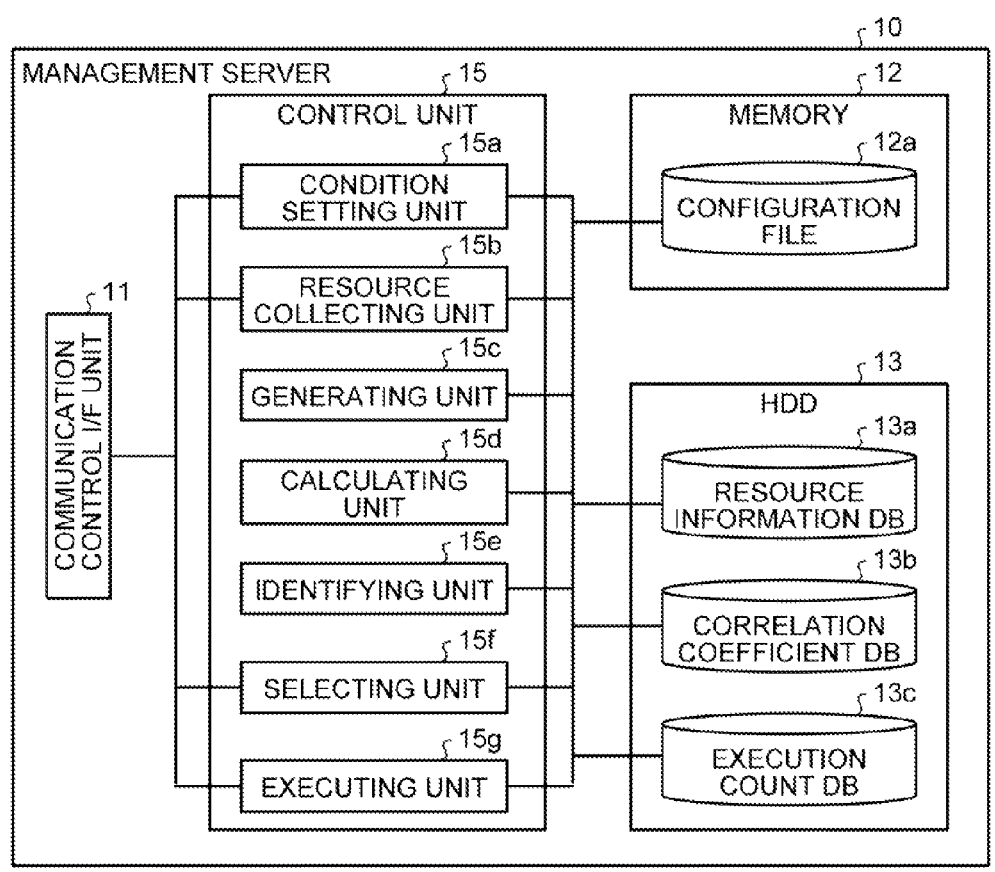
FIG. 2 is a functional block diagram illustrating a configuration of a management server according to the first embodiment.

FIG. 2 is a functional block diagram illustrating a configuration of the management server according to the first embodiment. Incidentally, the other devices illustrated in FIG. 1 have the same configurations as general devices, so detailed description of the other devices is omitted.

As illustrated in FIG. 2, the management server 10 includes a communication control I/F unit 11, a memory 12, a hard disk drive (HDD) 13, and a control unit 15. The communication control I/F unit 11 is an interface for controlling communication between the management server 10 and another device. For example, the communication control I/F unit 11 transmits config information for changing the settings through provisioning to another device, or receives resource information, such as a CPU (Central Processing Unit) usage rate or an amount of memory usage, from another device.

The memory 12 is a storage device for storing therein a program that the control unit 15 executes and the like, and stores therein a configuration file 12a. The configuration file 12a is a file in which conditions for determination used in identification of an object device of provisioning are set, and is updated by a condition setting unit 15a.

Figure 3:
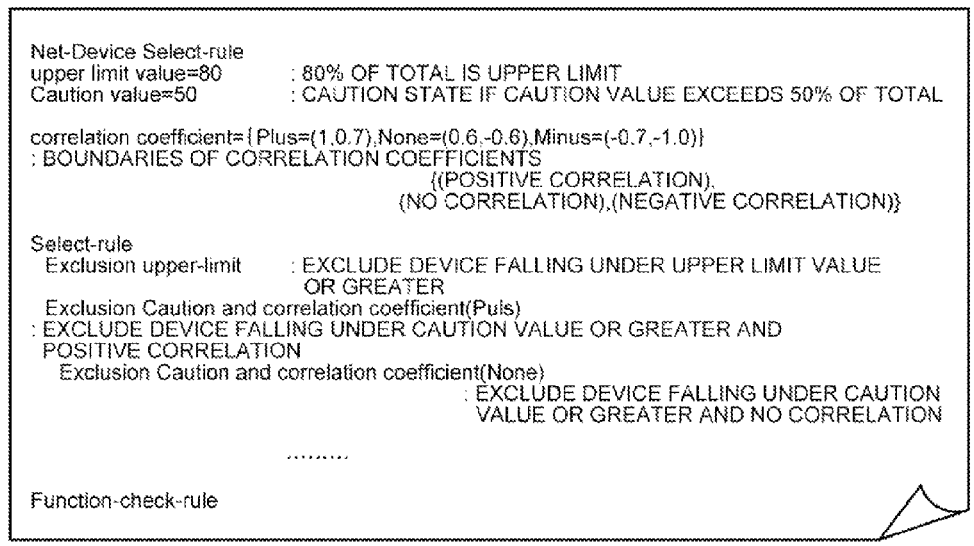
FIG. 3 is a diagram illustrating an example of a configuration file.

FIG. 3 is a diagram illustrating an example of the configuration file. As illustrated in FIG. 3, "upper limit value=80" is written in the configuration file 12a; that is, it is configured that an upper limit value of a resource, such as a CPU usage rate, is 80%. Furthermore, "Caution value=50" is written in the configuration file 12a; that is, it is configured that the resource goes into a caution state if a usage rate of the resource, such as a CPU usage rate, exceeds 50%. Moreover, "correlation coefficient={Plus=(1, 0.7), None=(0.6, −0.6), Minus=(−0.7, −1.0)}" is set in the configuration file 12a. That is, it is configured that a correlation is determined as a positive correlation when a correlation coefficient is a value ranging from "1 to 0.7", no correlation when the correlation coefficient is a value ranging from "0.6 to −0.6", and a negative correlation when the correlation coefficient is a value ranging from "−0.7 to −1.0". The correlation coefficient will be described later.

Furthermore, a condition for determination is defined by "Select-rule". Specifically, excluding a network device falling under the upper limit value or greater from an executed object is defined by "Exclusion upper-limit". Furthermore, excluding a network device falling under the Caution value or greater and a positive correlation is defined by "Exclusion Caution and correlation coefficient (Plus)". Namely, when a value of the resource is the Caution value or greater and a correlation coefficient is in a range of the above-set positive correlation, it is defined that the network device is excluded from an executed object. Moreover, excluding a network device falling under the Caution value or greater and no correlation is defined by "Exclusion Caution and correlation coefficient (None)". Namely, when a value of the resource is the Caution value or greater and a correlation coefficient is in a range of the above-set no correlation, it is defined that the network device is excluded from an executed object. Incidentally, the contents defined in the configuration file 12a can be arbitrarily changed.

The HDD 13 is a large-capacity storage device that holds therein a database and the like, and holds therein a resource information DB 13a, a correlation coefficient DB 13b, and an execution count DB 13c. The resource information DB 13a is a database that stores therein resource information of a managed object device collected by a resource collecting unit 15b with respect to each of "the FW 4a, the FW 4b, the LB 3a, and the LB 3b" that are management nodes. FIG. 4 is a diagram illustrating an example of information stored in the resource information DB. As illustrated in FIG. 4, the resource information DB 13a stores therein "recorded time, CPU information (current), CPU information (average), memory information (current), memory information (average), traffic information, connection information".

The "recorded time" stored here is the time when resource information was collected. The "CPU information (current)" is a CPU usage rate at the time of the collection, and the "CPU information (average)" is an average value of CPU usage rates from the past up to the time of the collection. The "memory information (current)" is an amount of memory usage at the time of the collection, and the "memory information (average)" is an average value of memory usage amounts from the past up to the time of collection. The "traffic information" is an amount of traffic detected by a management node, and the "connection information" is the number of connections through which the management node is connected or hooked up to another device.

In a case of the FW 4a in FIG. 4, information stored in the resource information DB 13a indicates that the latest resource was collected at 9:50 on Mar. 11, 2011; a CPU usage rate at the time of the collection is 20%; an average value of CPU usage rates from the past up to the time of collection is 20%. Furthermore, the information indicates that an amount of memory usage at the time of the collection is 100 MB, and an average value of memory usage amounts from the past up to the time of collection is 80 MB. Moreover, the information indicates that an amount of traffic detected by the FW 4a at the time of the collection is 200 Mbps, and the number of connections connected to the FW 4a was 100.

Incidentally, the information stored in the resource information DB 13a is updated by the resource collecting unit 15b. For example, the resource collecting unit 15b deletes information of which the storage period has expired on a regular basis. Furthermore, the resource collecting unit 15b deletes outdated information in chronological order as needed so that the number of records with respect to each management node does not exceed a predetermined value.

To return to FIG. 2, the correlation coefficient DB 13b is a database that stores therein a correlation coefficient calculated by a calculating unit 15d. FIG. 5 is a diagram illustrating an example of information stored in the correlation coefficient DB. As illustrated in FIG. 5, the correlation coefficient DB 13b stores therein a correlation coefficient calculated by the calculating unit 15d with respect to each of "the FW 4a, the FW 4b, the LB 3a, and the LB 3b" which are management nodes. The correlation coefficient DB 13b stores therein "recorded time, type of Config, definition amount, traffic information (average), correlation coefficient (definition-traffic), CPU information (average), correlation coefficient (CPU-traffic)" with respect to each firewall device.

The "recorded time" stored here is the time when a correlation coefficient was calculated, in other words, the time when the correlation coefficient was registered in the correlation coefficient DB. The "type of Config" indicates a type of a config set in a network device; "fw" is stored in a case of a firewall device, and "lb" is stored in a case of a load balancer. The "definition amount" is the number of commands written in the config or the number of lines of the config. The "traffic information (average)" is an average value of traffic information which has been collected till when the correlation coefficient was calculated. The "correlation coefficient (definition-traffic)" is a correlation coefficient calculated from the definition amount and the traffic information (average). The "CPU information (average)" is an average value of CPU usage rates which have been collected till when the correlation coefficient was calculated. The "correlation coefficient (CPU-traffic)" is a correlation coefficient calculated from the CPU information (average) and the traffic information (average).

In a case of the FW 4b in FIG. 5, information stored in the correlation coefficient DB 13b indicates that the latest correlation coefficient was calculated at 9:50 on Mar. 11, 2011; a definition amount of a Config at the time of the calculation is 100 lines; an average value of traffic information from the past up to the time of the calculation is 5030. Furthermore, the information indicates that a correlation coefficient (definition-traffic) at the time of the calculation is 0.1; an average value of CPU usage rates from the past up to the time of the calculation is 20%; a correlation coefficient (CPU-traffic) at the time of the calculation is 0.1.

Furthermore, the correlation coefficient DB 13b stores therein "recorded time, type of Config, definition amount, number of connections (average), correlation coefficient (definition-connections), CPU information (average), and correlation coefficient (CPU-connections)" with respect to each load balancer. The "recorded time, type of Config, definition amount, and CPU information (average)" stored here are the same as in a firewall device, so detailed description of these is omitted. The "number of connections (average)" is an average value of the number of connections which have been collected till when a correlation coefficient was calculated. The "correlation coefficient (definition-connections)" is a correlation coefficient calculated from the definition amount and the number of connections (average). The "correlation coefficient (CPU-connections)" is a correlation coefficient calculated from the CPU information (average) and the number of connections (average).

In a case of the LB 3b in FIG. 5, information stored in the correlation coefficient DB 13b indicates that the latest correlation coefficient was calculated at 9:50 on Mar. 11, 2011; a definition amount of a Config at the time of the calculation is 100 lines; an average value of the number of connections from the past up to the time of the calculation is 400. Furthermore, the information indicates that a correlation coefficient (definition-connections) at the time of the calculation is 0.7; an average value of CPU usage rates from the past up to the time of the calculation is 20%; a correlation coefficient (CPU-connections) at the time of the calculation is 0.1.

The execution count DB 13c is a database that stores therein the number of executions of provisioning with respect to each network device to be managed. FIG. 6 is a diagram illustrating an example of information stored in the execution count DB. As illustrated in FIG. 6, the execution count DB 13c stores therein "device, number of times" in an associated manner. The "device" stored here is a network device to be managed; in the present embodiment, the device corresponds to the FW 4a, the FW 4b, the LB 3a, and the LB 3b. The "number of times" is the number of executions of provisioning. In the example of FIG. 6, the information indicates that provisioning is executed on the LB 3b eight times.

The control unit 15 is a processing unit that includes the condition setting unit 15a, the resource collecting unit 15b, a generating unit 15c, the calculating unit 15d, an identifying unit 15e, a selecting unit 15f, and an executing unit 15g and executes various processes pertaining to provisioning with these units. This control unit 15 is an electronic circuit, such as a CPU.

The condition setting unit 15a is a processing unit that stores a configuration file input from an operator or the like in the memory 12. The condition setting unit 15a checks contents of the configuration file, and if there is a spelling error or a conflicting definition statement, etc. in the configuration file, the condition setting unit 15a judges a check result as an error and notifies of the error.

The resource collecting unit 15b is a processing unit that collects resource information from a managed object device at predetermined intervals and stores the collected resource information in the resource information DB 13a. The resource collecting unit 15b acquires a CPU usage rate and an amount of memory usage from a network device, such as the FW 4a or the LB 3a, using SNMP (Simple Network Management Protocol) or the like.

Furthermore, the resource collecting unit 15b acquires traffic information and connection information that a network device, such as the FW 4a or the LB 3a, has acquired using a network monitor or monitoring tool. Then, the resource collecting unit 15b stores the acquired information in the resource information DB 13a. Moreover, as for a CPU usage rate and an amount of memory usage, the resource collecting unit 15b calculates an average value up to the present and stores the calculated average value in the resource information DB 13a.

The generating unit 15c is a processing unit that generates config information for changing the settings through provisioning. The generating unit 15c holds therein a template in which an event, config information to be set, and a type of set object device are associated in advance. Then, at the timing, such as upon detection of an event of provisioning, when instructed to start provisioning from an operator, or when a provisioning executed object has been identified, the generating unit 15c identifies config information and a type of device from templates. Then, the generating unit 15c notifies the calculating unit 15d and the identifying unit 15e, etc. of the config information and type of the provisioning executed object.

For example, when a new VM has been activated on a server and a provisioning executed object has been identified, the generating unit 15c detects an event of provisioning to acquire a resource. Then, the generating unit 15c generates config information added with "rule XXX" as a template corresponding to the "VM activation". And then, the generating unit 15c sends the generated config information indicating a request for execution of provisioning on any of the "FWs" to another processing unit.

The calculating unit 15d is a processing unit that calculates a correlation coefficient between an amount of setting information due to provisioning executed on a network device and communication load information of the network device. The communication load information is, for example, traffic information or the number of connections of the network device. When the calculating unit 15d has received a request for execution of provisioning from the generating unit 15c or when the executing unit 15g has stored a new definition amount or the like in the correlation coefficient DB 13b, the calculating unit 15d calculates a correlation coefficient.

When the provisioning has completed successfully, the executing unit 15g stores the definition amount and the type of config set in the provisioning in corresponding fields of the correlation coefficient DB 13b. When the calculating unit 15d has detected this, the calculating unit 15d calculates respective average values of traffic information, connection information, and CPU information that have been collected from the resource information DB 13a up to the present, and stores the calculated average values in the correlation coefficient DB 13b. Then, the calculating unit 15d substitutes the definition amount, the traffic information (average), the number of connections (average), the CPU information (average), and the like which have been newly stored in the correlation coefficient DB 13b into the Pearson product-moment correlation coefficient calculating equation (1) and calculates a correlation coefficient (r). The calculating unit 15d calculates a correlation coefficient (definition-traffic) and a correlation coefficient (CPU-traffic) in this way, and stores the calculated correlation coefficients in the correlation coefficient DB 13b to be associated with the above-described definition amount and the like.

$$r = \frac{\sum (x_k - m)(y_k - n)}{\sqrt{\sum (x_k - m)^2} \sqrt{\sum (y_k - m)^2}} \quad (1)$$

Here, an example of how to calculate a correlation coefficient (definition-traffic) is explained taking a FW as an example. When the executing unit 15g has newly stored a definition amount in the correlation coefficient DB 13b, the calculating unit 15d calculates traffic information (average) from the resource information DB 13a, and stores the calculated traffic information (average) in the correlation coefficient DB 13b. Then, the calculating unit 15d substitutes the newly-stored "definition amount" into "$x_k$" in the Pearson's equation, and substitutes an average value of "definition amounts" stored in the correlation coefficient DB 13b into "m". Furthermore, the calculating unit 15d substitutes the newly-stored "traffic information (average)" into "$y_k$" in the Pearson's equation, and substitutes an average value of "traffic information (average)" stored in the correlation coefficient DB 13b into "n". In this state, the calculating unit 15d calculates the equation (1) and obtains a "correlation coefficient (definition-traffic)". After that, the calculating unit 15d stores the calculated "correlation coefficient (definition-traffic)=r" in the correlation coefficient DB 13b.

Incidentally, in a case of calculating a correlation coefficient (CPU-traffic), the calculating unit 15d substitutes the newly-stored "CPU information (average)" into "$x_k$", and substitutes an average value of "CPU information (average)" stored in the correlation coefficient DB 13b into "m". Then, the calculating unit 15d substitutes the newly-stored "traffic information (average)" into "$y_k$", and substitutes an average value of "traffic information (average)" stored in the correlation coefficient DB 13b into "n".

Furthermore, in a case of calculating a correlation coefficient (definition-connections), the calculating unit 15d substitutes the newly-stored "definition amount" into "$x_j$", and substitutes an average value of "definition amounts" stored in the correlation coefficient DB 13b into "m". Then, the calculating unit 15d substitutes the newly-stored "connection information (average)" into "$y_k$", and substitutes an average value of "connection information (average)" stored in the correlation coefficient DB 13b into "n".

Moreover, in a case of calculating a correlation coefficient (CPU-connections), the calculating unit 15d substitutes the newly-stored "CPU information (average)" into "$x_j$", and substitutes an average value of "CPU information (average)" stored in the correlation coefficient DB 13b into "m". Then, the calculating unit 15d substitutes the newly-stored "connection information (average)" into "$y_k$", and substitutes an average value of "connection information (average)" stored in the correlation coefficient DB 13b into "n".

The identifying unit 15e is a processing unit that identifies a network device that the load thereon is on a rising trend on the basis of a correlation coefficient calculated by the calculating unit 15d and processing load information of the network device. The processing load information is, for example, a CPU usage rate or an amount of memory usage. The identifying unit 15e identifies a FW or a LB that meets the following conditions written in the configuration file with reference to the correlation coefficient DB 13b.

[Condition 1] Out of devices affected by traffic such as a FW, a device of which the CPU usage rate or the amount of memory usage is greater than the caution value (50%) and values of the correlation coefficient (definition number-traffic) and the correlation coefficient (CPU-traffic) are in the range of positive correlation.

[Condition 2] Out of devices affected by the number of connections such as a LB, a device of which the CPU usage rate or the amount of memory usage is greater than the caution value and values of the correlation coefficient (definition number-connections) and the correlation coefficient (CPU-connections) are in the range of positive correlation.

[Condition 3] Out of devices affected by traffic such as a FW, a device of which the CPU usage rate or the amount of memory usage is greater than the caution value and values of the correlation coefficient (definition number-traffic) and the correlation coefficient (CPU-traffic) are in the range of no correlation.

[Condition 4] Out of devices affected by the number of connections such as a LB, a device of which the CPU usage rate or the amount of memory usage is greater than the caution value and values of the correlation coefficient (definition number-connections) and the correlation coefficient (CPU-connections) are in the range of no correlation.

Furthermore, the identifying unit 15e also identifies a device of which the CPU usage rate or the amount of memory usage is greater than the upper limit value (80%) out of devices that do not fall under the "Conditions 1 to 4". Then, the identifying unit 15e notifies the selecting unit 15f of information on the identified device.

To return to FIG. 2, the selecting unit 15f is a processing unit that selects a provisioning executed object device from network devices other than a network device identified by the identifying unit 15e. In a case where there is one FW other than a FW identified by the identifying unit 15e, the selecting unit 15f selects the one FW as a provisioning executed object.

On the other hand, in a case where there are multiple FWs other than a FW identified by the identifying unit 15e, the selecting unit 15f selects a FW corresponding to the minimum number of executions in the multiple FWs as a provisioning executed object with reference to the execution count DB 13c. Incidentally, also in a case of a LB, the selecting unit 15f selects a LB in the same manner as in the case of a FW. Then, the selecting unit 15f notifies the executing unit 15g of information on the selected network device.

The executing unit 15g is a processing unit that executes provisioning to set a config generated by the generating unit 15c in a network device selected by the selecting unit 15f. When notified of a network device from the selecting unit 15f, the executing unit 15g increments the number of times stored in the execution count DB 13c by one. Then, the executing unit 15g sets a config generated by the generating unit 15c in the network device. Here, if the config setting has terminated abnormally, the executing unit 15g restores the config to the previous state, and decrements the number of times stored in the execution count DB 13c by one.

Processing Flow

Subsequently, processes performed by the management server are explained with reference to FIGS. 7 to 10. Here, a flow of a resource collecting process, a flow of a process of selecting a provisioning executed object, a flow of a config managing process, and a flow of a provisioning process are explained.

Flow of Resource Collecting Process

FIG. 7 is a flowchart illustrating the flow of the resource collecting process. As illustrated in FIG. 7, when it comes to collect a resource (YES at Step S101), the resource collecting unit 15b selects one network device from network devices to be managed as a collecting object (Step S102).

Then, the resource collecting unit 15b collects a resource from the selected network device using general tool or software, such as SNMP, monitoring tool, or a network monitor, and stores the collected resource in the resource information DB 13a (Step S103).

After that, as for a CPU usage rate and an amount of memory usage out of collected resources, the resource collecting unit 15b calculates respective average value of previously-collected CPU usage rates and memory usage amounts, and stores the calculated average values in the resource information DB 13a (Step S104). Incidentally, the resource collecting unit 15b stores the resource collected at Step S103, the average value calculated at Step S104, and the date and time when the resource was collected in an associated manner. Furthermore, the resource collecting unit 15b deletes outdated data of which the storage period has expired from the resource information DB 13a (Step S105).

After that, if there is a network device of which the resource has not yet been collected in the network devices to be managed (YES at Step S106), the resource collecting unit 15b repeatedly performs the steps from Step S102 onwards. On the other hand, if there is no network device of which the resource has not yet been collected in the network devices to be managed (NO at Step S106), the resource collecting unit 15b ends the process.

Flow of Process of Selecting a Provisioning Executed Object

Figure 8B:
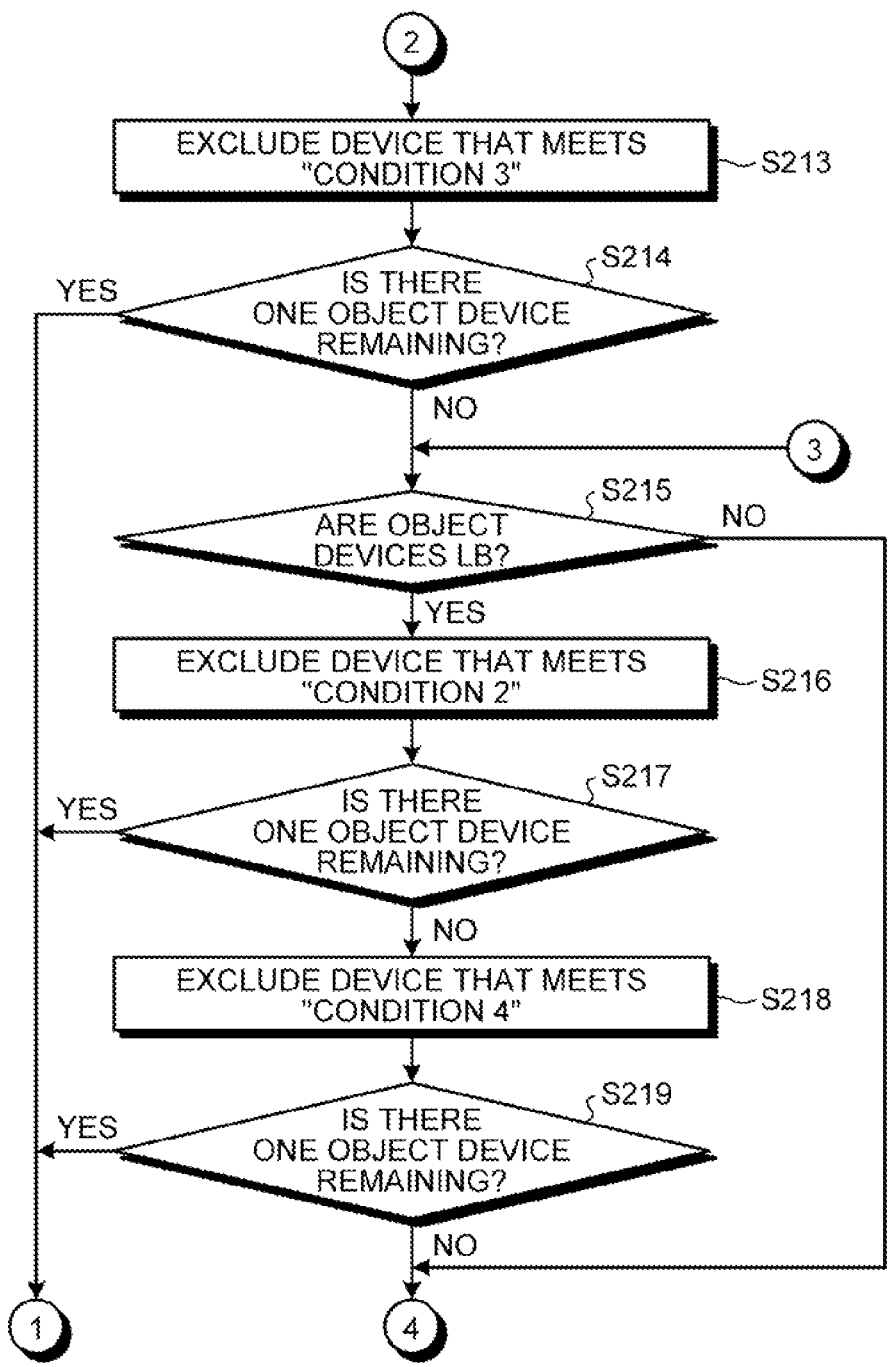
FIG. 8B is a flowchart illustrating the flow of the process of selecting a provisioning executed object.

FIGS. 8A, 8B, and 8C are flowcharts illustrating the flow of the process of selecting a provisioning executed object. As illustrated in FIG. 8A, in the event of provisioning (YES at Step S201), the calculating unit 15d starts the process. Incidentally, here, the event of provisioning is a trigger to start the process; however, the trigger is not limited to this, and the process can be started when the executing unit 15g has stored a new definition amount or the like in the correlation coefficient DB 13b.

The calculating unit 15d, which has started the process, calculates a correlation coefficient (1) between the number of definitions of a config and an average amount of traffic with respect to each of the FW 4a and the FW 4b, and stores the calculated correlation coefficient (1) together with information used in the calculation in the correlation coefficient DB 13b (Step S202). Namely, the calculating unit 15d calculates a correlation between a change in the number of commands in the config and a change in an amount of traffic.

Then, the calculating unit 15d calculates a correlation coefficient (2) between the number of definitions of a config and the average number of connections with respect to each of the LB 3a and the LB 3b, and stores the calculated correlation coefficient (2) together with information used in the calculation in the correlation coefficient DB 13b (Step S203). Namely, the calculating unit 15d calculates a correlation between a change in the number of commands in the config and a change in the number of connections.

Then, the calculating unit 15d calculates a correlation coefficient (3) between an average CPU usage rate and an average amount of traffic with respect to each of the FW 4a and the FW 4b, and stores the calculated correlation coefficient (3) together with information used in the calculation in the correlation coefficient DB 13b (Step S204). Namely, the calculating unit 15d calculates a correlation between a change in an amount of traffic and a change in a CPU usage rate.

Then, the calculating unit 15d calculates a correlation coefficient (4) between an average CPU usage rate and the average number of connections with respect to each of the LB 3a and the LB 3b, and stores the calculated correlation coefficient (4) together with information used in the calculation in the correlation coefficient DB 13b (Step S205). Namely, the calculating unit 15d calculates a correlation between a change in the number of connections and a change in a CPU usage rate.

Then, the identifying unit 15e generates a network topology or the like to grasp physical connections, and selects a network device to be an object of provisioning (Step S206). Then, if there is more than one network device selected (NO at Step S207), the identifying unit 15e excludes a device of which the processing load information exceeds the upper limit value from an object of provisioning (Step S208). The identifying unit 15e excludes a device that any of a CPU usage rate and an amount of memory usage thereof exceeds 80% of the total in the selected network devices from an object of provisioning with reference to the CPU information (current) and memory information (current) stored in the resource information DB 13a. Incidentally, a memory usage rate can be calculated by dividing an amount of memory usage stored in the resource information DB 13a by a memory capacity that each device has.

Then, if, as a result of the exclusion of the device of which the processing load information exceeds the upper limit value from an object of provisioning, there is still more than one object device (NO at Step S209), the identifying unit 15e determines whether the remaining devices are a FW (Step S210).

When the object devices are both a FW (YES at Step S210), the identifying unit 15e excludes a network device that meets the "Condition 1" from a provisioning object device (Step S211). Namely, the identifying unit 15e excludes a device of which the CPU usage rate or the amount of memory usage is greater than the caution value (50%) and values of the correlation coefficient (1) and the correlation coefficient (3) are in the range of positive correlation.

Then, if, as a result of the exclusion of the network device that meets the "Condition 1" from a provisioning object device, there is still more than one object device (NO at Step S212), the identifying unit 15e performs Step S213 illustrated in FIG. 8B. Namely, the identifying unit 15e excludes a network device that meets the "Condition 3" from a provisioning object device. In other words, the identifying unit 15e excludes a device of which the CPU usage rate or the amount of memory usage is greater than the caution value and values of the correlation coefficient (1) and the correlation coefficient (3) are in the range of no correlation.

Then, if, as a result of the exclusion of the network device that meets the "Condition 3" from a provisioning object device, there is still more than one object device (NO at Step S214), the identifying unit 15e determines whether the remaining devices are a LB (Step S215).

When the object devices are both a LB (YES at Step S215), the identifying unit 15e excludes a network device that meets the "Condition 2" from a provisioning object device (Step S216). Namely, the identifying unit 15e excludes a device of which the CPU usage rate or the amount of memory usage is greater than the caution value and values of the correlation coefficient (2) and the correlation coefficient (4) are in the range of positive correlation.

Then, if, as a result of the exclusion of the network device that meets the "Condition 2" from a provisioning object device, there is still more than one object device (NO at Step S217), the identifying unit 15e excludes a network device that meets the "Condition 4" from a provisioning object device (Step S218). Namely, the identifying unit 15e excludes a device of which the CPU usage rate or the amount of memory usage is greater than the caution value and values of the correlation coefficient (1) and the correlation coefficient (3) are in the range of no correlation.

Then, if, as a result of the exclusion of the network device that meets the "Condition 4" from a provisioning object device, there is still more than one object device (NO at Step S219), the identifying unit 15e performs Step S220 illustrated in FIG. 8C. Namely, the identifying unit 15e selects a network device corresponding to the minimum number of executions with reference to the execution count DB 13c.

Then, if, as a result of the selection of the network device corresponding to the minimum number of executions, there is still more than one object device (NO at Step S221), the identifying unit 15e selects any one of the remaining devices (Step S222). The identifying unit 15e can select any one of the devices, for example, in order in which devices to be managed have been registered. After that, the generating unit 15c and the executing unit 15g perform the config managing process (Step S223), and when the config managing process has completed successfully (YES at Step S224), the process is ended.

On the other hand, when the config managing process performed by the generating unit 15c and the executing unit 15g has terminated abnormally (NO at Step S224), the device which has been selected and subjected to provisioning is excluded from an object candidate (Step S225), return to Step S202, and the steps from Step S202 onwards are performed.

Furthermore, at any of Steps S207, S209, S212, S214, S217, S219, and S221, when the identifying unit 15e has determined that there is one object device remaining (YES at any of these Steps), Step S223 is performed. Moreover, at Step S210, when the identifying unit 15e has determined that the object devices are not a FW (NO at Step S210), Step S215 is performed. Furthermore, at Step S215, when the identifying unit 15e has determined that the object devices are not a LB (NO at Step S215), Step S220 is performed.

Flow of Config Managing Process

Figure 9:
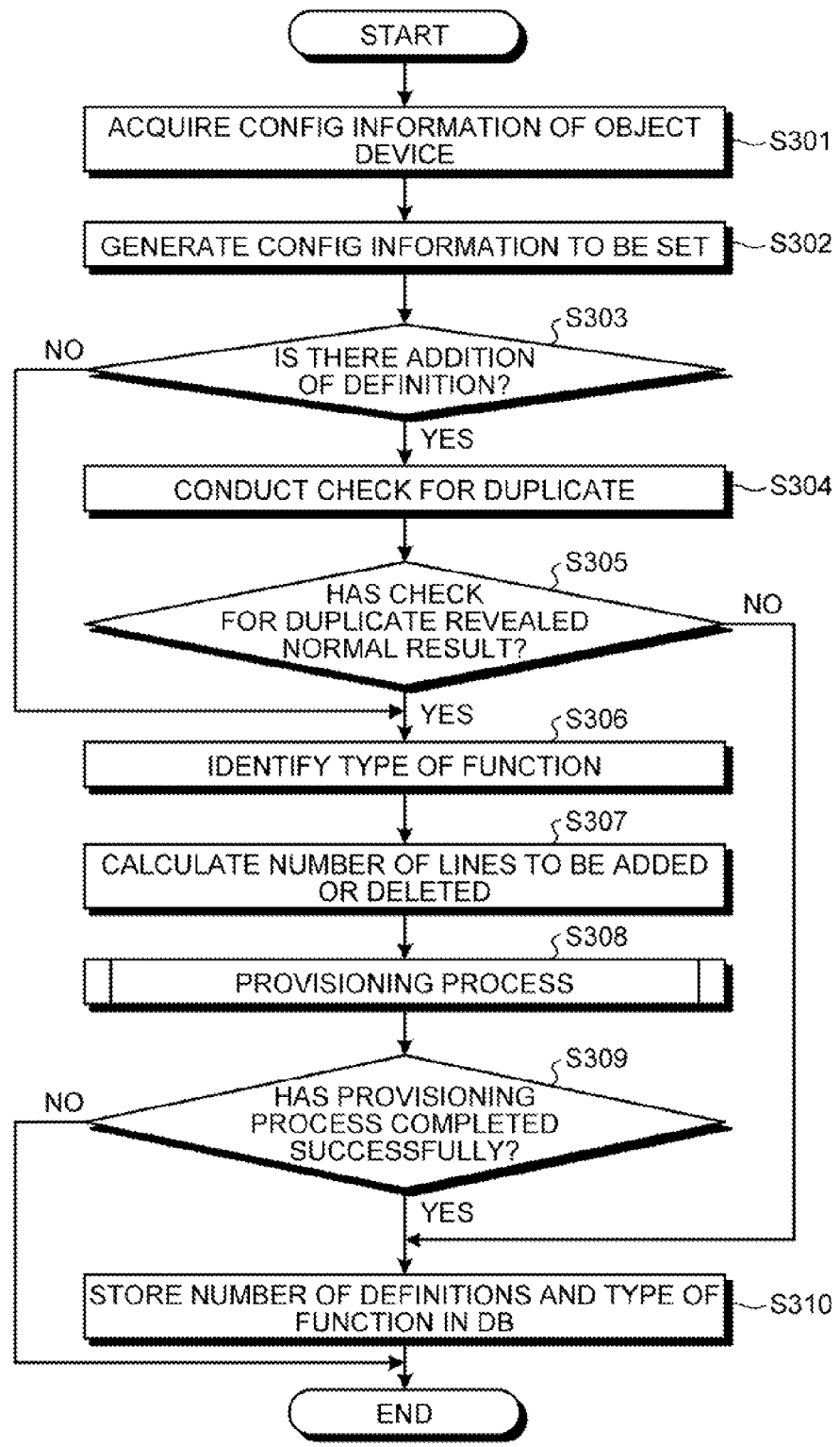
FIG. 9 is a flowchart illustrating a flow of a config managing process.

FIG. 9 is a flowchart illustrating the flow of the config managing process. As illustrated in FIG. 9, the generating unit 15c acquires config information set in each device from a network device identified by the identifying unit 15e (Step S301).

Then, the generating unit 15c generates config information to be newly set using a template, etc. corresponding to a process that triggered the execution of provisioning (Step S302). Then, the generating unit 15c compares the currently-set config information acquired at Step S301 with the config information generated at Step S302, i.e., the config information to be newly set (Step S303).

Then, when the generating unit 15c has determined that this provisioning is an addition to the config information as a result of the comparison (YES at Step S303), the generating unit 15c conducts a check for duplicate (Step S304). Specifically, the generating unit 15c checks whether a command to be newly set is already included in the existing config (whether there is a command to be set additionally).

Then, when the check for duplicate has revealed a normal result, i.e., a command to be newly set is not included in the existing config (YES at Step S305), the generating unit 15c identifies a type of function from the config (Step S306). For example, the generating unit 15c identifies a type of function on the basis of "rule firewall xx", etc. written in the config. Incidentally, in this case, it is identified as fw.

After that, the generating unit 15c compares the currently-set config information acquired at Step S301 with the config information generated at Step S302, i.e., the config information to be newly set, and calculates the number of commands or lines to be added or deleted (Step S307).

Then, the executing unit 15g performs the provisioning process to set the new config information generated by the generating unit 15c in a network device selected by the selecting unit 15f (Step S308).

After that, when the provisioning process has completed successfully (YES at Step S309), the executing unit 15g performs Step S310. Namely, the executing unit 15g calculates the number of newly-set definitions on the basis of the number of the increased/decreased commands or lines calculated at Step S307 and the previous config information, and stores the number of definitions in the correlation coefficient DB 13b to be associated with the type of function identified at Step S306 (Step S310). On the other hand, when the provisioning process has terminated abnormally (NO at Step S309), the executing unit 15g ends the process without performing Step S310.

Furthermore, at Step S303, when the generating unit 15c has determined that the number of definitions of the config is decreased (NO at Step S303), Step S306 is performed. Moreover, at Step S305, when the check for duplicate has revealed an abnormal result (NO at Step S305), the executing unit 15g performs Step S310.

Flow of Provisioning Process

Figure 10:
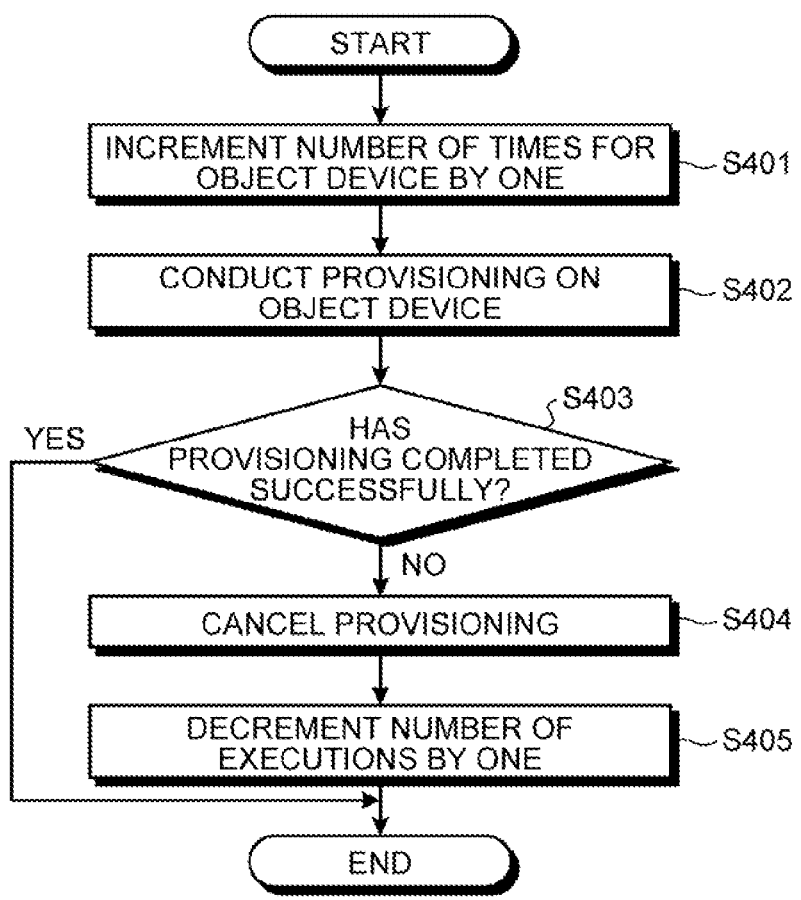
FIG. 10 is a flowchart illustrating a flow of a provisioning process.

FIG. 10 is a flowchart illustrating the flow of the provisioning process. As illustrated in FIG. 10, before the execution of provisioning, the executing unit 15g increments the number of executions of provisioning conducted on a provisioning executed object device stored in the execution count DB 13c by one (Step S401).

Then, the executing unit 15g conducts provisioning on the provisioning executed object device, and updates the config (Step S402). Then, when the provisioning has completed successfully (YES at Step S403), the executing unit 15g ends the process.

On the other hand, when the provisioning has terminated abnormally (NO at Step S403), the executing unit 15g executes cancellation of the provisioning and restores the config to the state before the update (Step S404), and decrements the incremented number of executions by one (Step S405).

In this manner, the management server 10 calculates correlation coefficients as indicators indicating how the load is affected by changes in settings from the past up to the present and what the load status is at present, and selects a device of which the calculated correlation coefficient is a negative value and the present load thereon is low. Therefore, the management server 10 can prevent an object of provisioning from being biased toward a high-performance network device or the like. Furthermore, even in the event of continuous provisioning, the management server 10 can prevent objects of the provisioning from being biased toward one network device or the like. As a result, the efficiency of system operation can be prevented from being degraded by changing the settings of network devices.

The strength of a positive correlation here represents the strength of the potential for an increase in device load on a network device when the number of lines in config information of the network device is increased upon request for the provisioning process. Therefore, on the assumption that the device load on the network device is more likely to be increased by a certain amount when information is added into the config information, the strength of a positive correlation is used. Furthermore, no correlation represents that an increase in the number of lines in config information is unconnected with an increase in device load on a network device, and indicates that the network device is a device that is difficult to forecast the load.

Moreover, a negative correlation represents that the device load on a network device is less likely to be increased when the number of lines in config information is increased. Because of these, the management server 10 calculates correlation coefficients, thereby excluding a device that the load thereon is more likely to be increased by a change in the config settings and selecting an object of provisioning from devices that the load thereon is less likely to be increased by a change in the config settings. Namely, the management server 10 can exclude a provisioning object network device unfit for a change in the config settings, and can control not to execute provisioning on a selected network device if the selected network device is likely to disturb the system load balance.

As a result, the management server 10 achieves provisioning enabling the loads on network devices to be equalized in an environment that many users use like in a cloud system and is difficult to forecast the load, and as a result, the efficient system operation can be achieved. Furthermore, the management server 10 performs provisioning enabling the loads on the network devices to be kept from being out of balance, so that it is possible to avoid performing provisioning on a high-load network device and also possible to improve a variation in a provisioning processing time.

[b] Second Embodiment

The embodiment according to the present invention is explained above; however, besides the above embodiment, the present invention can be implemented in various different forms. Therefore, a different embodiment will be explained below.

Correlation Coefficient

In the above embodiment, there is described an example where a correlation coefficient between a config definition amount and a traffic amount and a correlation coefficient between the config definition amount and the number of connections are calculated; however, a correlation coefficient is not limited to these. As a correlation coefficient, a correlation between a config definition amount and communication load information according to identification of a network device just has to be calculated. For example, when an object device is a switch, the number of virtual local area networks (ULAN) can be used; when an object device is a router, a correlation coefficient can be calculated by the total number of hops in route information. Furthermore, instead of the config definition amount, the number of increased/decreased commands or lines in the config can be used. Incidentally, in the above embodiment, there is described an example where a correlation coefficient is calculated by using the Pearson product-moment correlation coefficient calculating equation; however, the other general correlation coefficient calculating equations or algorithms can be used. Incidentally, the config definition amount is, for example, config information, and is an amount of config definitions defined as a config.

Object Device

In the above embodiment, there is described an example where a FW or a LB is an object device of provisioning; however, the object device is not limited to these, and can be a switch, a router, and the like. Furthermore, the present invention can be similarly applied to configurations other than the system configuration illustrated in FIG. 1.

Identification Method

In the above embodiment, after all devices that meet the first condition are excluded from objects, whether the remaining devices meet the next condition is determined; however, the way to determine one object is not limited to this. Alternatively, in the determination of whether to meet each condition, after one device that meets a condition is excluded, a correlation coefficient can be newly calculated, and whether to meet the condition can be determined. In this manner, the correlation coefficient calculating process, the condition determining process, and the process of excluding one device can be repeatedly performed until one device is left.

Furthermore, in the above embodiment, there is described an example where whether to meet one of the conditions is sequentially determined; however, the way to determine one object is not limited to this. Alternatively, the determination can be made with only one condition, or a combination of any of the conditions and load information can be used. Moreover, the timing to calculate a correlation coefficient and the timing to start the provisioning can be different timings. A correlation coefficient can be calculated as needed, and the process of identifying an object device can be performed by using the latest correlation coefficient.

System

Out of the processes described in the present embodiments, all or part of the process described as an automatically-performed one can be manually performed. Or, all or part of the process described as a manually-performed one can be automatically performed by a publicly-known method. In addition, the processing procedures, control procedures, specific names, and information including various data and parameters illustrated in the above description and the drawings can be arbitrarily changed unless otherwise specified.

Furthermore, the components of each device illustrated in the drawings are functionally conceptual ones, and do not always have to be physically configured as illustrated in the drawings. Namely, specific forms of division and integration of the components in the device are not limited to those illustrated in the drawings. In other words, all or some of the components can be configured to be functionally or physically divided or integrated in arbitrary units depending on respective loads or use conditions. Moreover, all or any part of processing functions implemented in the device can be realized by a CPU and a program analyzed and executed by the CPU, or can be realized as hardware by wired logic.

Hardware Configuration

Incidentally, the various processes described in the above embodiments can be realized by causing a computer system, such as a personal computer or a workstation, to execute a program prepared in advance. An example of the computer system that executes a program having the same function as those described in the above embodiments is explained below.

Figure 11:
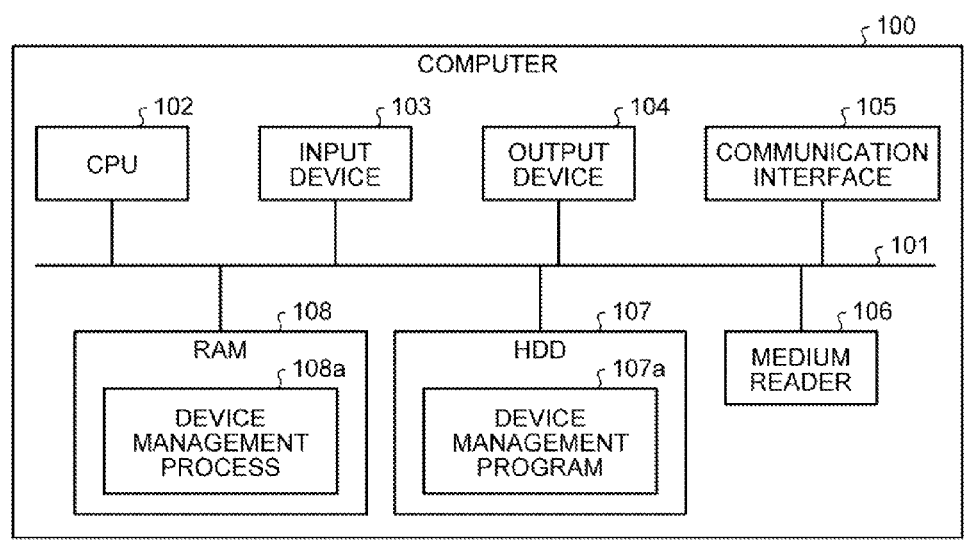
FIG. 11 is a diagram illustrating a hardware configuration example of a computer that executes a device management program.

FIG. 11 is a diagram illustrating a hardware configuration example of a computer that executes a device management program. As illustrated in FIG. 11, a computer 100 includes a CPU 102, an input device 103, an output device 104, a communication interface 105, a medium reader 106, a hard disk drive (HDD) 107, and a random access memory (RAM) 108. The units illustrated in FIG. 11 are connected to one another by a bus 101.

The input device 103 is a mouse and a keyboard; the output device 104 is a display or the like; the communication interface 105 is an interface such as a network interface card (NIC). The HDD 107 stores therein a device management program 107a and the DBs illustrated in FIG. 2. The HDD 107 is taken as an example of a recording medium; alternatively, such a program can be stored in another computer-readable recording medium, such as a read-only memory (ROM), a RAM, or a CD-ROM, and the computer reads out the program from the recording medium. Incidentally, the recording medium can be placed in a remote location, and the computer accesses the recording medium to acquire and use the program. Furthermore, at that time, the computer can store the acquired program in its own recording medium.

The CPU 102 reads out the device management program 107a from the HDD 107 and expands the read device management program 107a into the RAM 108, thereby operating a device management process 108a that implements the functions described in FIG. 2, etc. Namely, the device management process 108a implements the condition setting unit 15a, the resource collecting unit 15b, the generating unit 15c, the calculating unit 15d, the identifying unit 15e, the selecting unit 15f, and the executing unit 15g illustrated in FIG. 2. In this manner, the computer 100 reads and executes the program, thereby operating as an information processing apparatus that executes a device management method.

Furthermore, the computer 100 can read a provisioning execution control program from a recording medium with the medium reader 106, and execute the read device management program, thereby implementing the same functions as those described in the above embodiments. Incidentally, the program in this embodiment is not limited to be executed by the computer 100. The present invention can be similarly applied to a case where another computer or a server executes the program and a case where another computer and the server execute the program in cooperation.

It is possible to suppress degradation of an efficiency of the system operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device management apparatus comprising:
a memory; and
a processor coupled to the memory, wherein the processor executes a process comprising:
calculating a first correlation coefficient which indicates load of a network device affected by changes in settings executed on the network device using an amount of setting information due to provisioning executed on the network device and communication load information of the network device with respect to each of network devices which are objects of management;
identifying a network device of which the load is increasing on the basis of the first correlation coefficient calculated at the calculating and load information of processing of the network device; and
selecting an object of change of the settings from among network devices other than the network device identified at the identifying.

2. The device management apparatus according to claim 1, wherein the identifying includes identifying a network device of which the first correlation coefficient is greater than a predetermined value and the load information of processing is greater than a predetermined value as the network device of which the load is increasing.

3. The device management apparatus according to claim 1, wherein the first correlation coefficient is a correlation coefficient between the number of definitions set in the network device and an amount of traffic passing through the network device or a correlation coefficient between the number of definitions set in the network device and the number of connections to which the network device is connected.

4. The device management apparatus according to claim 1, wherein
the calculating includes calculating a second correlation coefficient between an amount of traffic passing through the network device and the load information of processing of the network device or a third correlation coefficient between the number of connections to which the network device is connected and the load information of processing of the network device, and
the identifying includes identifying a network device of which the load is increasing on the basis of the first correlation coefficient, the second correlation coefficient and the load information of processing used in calculation of the first correlation coefficient and the second correlation coefficient or identifying a network device of which the load is increasing on the basis of the first correlation coefficient, the third correlation coefficient and the load information of processing used in calculation of the first correlation coefficient and the third correlation coefficient.

5. The device management apparatus according to claim 1, wherein the selecting includes selecting a network device having the minimum number of times that the settings are changed among the network devices other than the network device identified at the identifying.

6. A device management method executed by a computer, the device management method comprising:
   calculating a first correlation coefficient which indicates load of a network device affected by changes in settings executed on the network device using an amount of setting information due to provisioning executed on the network device and communication load information of the network device with respect to each of network devices which are objects of management;
   identifying a network device of which the load is increasing on the basis of the first correlation coefficient and load information of processing of the network device; and
   selecting an object of change of the settings from among network devices other than the identified network device.

7. A computer-readable storage medium having stored therein a device management program causing a computer to execute a process comprising:
   calculating a correlation coefficient which indicates load of a network device affected by changes in settings executed on the network device using an amount of setting information due to provisioning executed on the network device and communication load information of the network device with respect to each of network devices which are objects of management;
   identifying a network device of which the load is increasing on the basis of the first correlation coefficient and load information of processing of the network device; and
   selecting an object of change of the settings from among network devices other than the identified network device.

8. The device management apparatus according to claim 1, wherein
   the calculating includes calculating the first correlation coefficient when a configuration of a server is changed and the changes in settings of the network device are requested in a system including a plurality of servers which provide services to a user terminal, the device management apparatus and a plurality of network devices which relay communication between the plurality of servers and the user terminal, and
   the selecting includes selecting the network device of which load of processing is the smallest as the object of change of the settings.

9. The device management apparatus according to claim 1, wherein
   the calculating includes calculating the first correlation coefficient when a configuration of a server is changed and the changes in settings of the network device are requested in a system including a plurality of servers which provide services to a user terminal, the device management apparatus and a plurality of network devices which relay communication between the plurality of servers and the user terminal, and
   the selecting includes selecting the network device of the object of change of the settings using a condition corresponding to a type of the network device to which the changes in settings are requested.

* * * * *